(12) United States Patent
Siddiqui et al.

(10) Patent No.: US 8,363,062 B2
(45) Date of Patent: Jan. 29, 2013

(54) METHOD AND UNIT FOR GENERATING A RADIANCE MAP

(75) Inventors: Muhammad Siddiqui, Esslingen (DE); Muhammad Atif, Stuttgart (DE)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 12/797,216

(22) Filed: Jun. 9, 2010

(65) Prior Publication Data

US 2010/0328315 A1  Dec. 30, 2010

(30) Foreign Application Priority Data

Jun. 26, 2009  (EP) .................................. 09008407

(51) Int. Cl.
*G09G 5/00* (2006.01)
(52) U.S. Cl. ........ 345/581; 345/418; 345/419; 345/420; 345/440; 345/582; 345/583; 345/584; 345/585; 345/586; 345/587; 345/588
(58) Field of Classification Search .................. None
See application file for complete search history.

(56) References Cited

U.S. PATENT DOCUMENTS

| | | | | |
|---|---|---|---|---|
| 7,505,606 | B2 * | 3/2009 | Lin et al. ...................... | 382/100 |
| 2005/0013477 | A1 * | 1/2005 | Ratti et al. .................... | 382/154 |
| 2005/0243176 | A1 * | 11/2005 | Wu et al. ..................... | 348/207.1 |
| 2006/0133688 | A1 * | 6/2006 | Kang et al. .................... | 382/254 |
| 2006/0177150 | A1 * | 8/2006 | Uyttendaele et al. ......... | 382/284 |
| 2008/0170799 | A1 * | 7/2008 | Chen et al. .................... | 382/274 |
| 2008/0198235 | A1 * | 8/2008 | Chen et al. ............... | 348/207.99 |
| 2009/0099767 | A1 * | 4/2009 | Jung ............................ | 701/200 |

OTHER PUBLICATIONS

E. Reinhard, et al. "HDR Image Capture", High Dynamic Range Imaging: Acquisition, Display, and Image-Based Lighting, Aug. 2005, 13 pages.

Paul E. Debevec et al., "Recovering High Dynamic Range Radiance Maps from Photographs", SIGGRAPH 97, Aug. 1997, 10 pages.

Ahmet Oğuz Akyüz et al., "Noise reduction in high dynamic range imaging", Science Direct, J. Vis. Commun. Image R., 18, (2007), pp. 366-376.

Sing Bing Kang et al., "High Dynamic Range Video", Interactive Visual Media Group, Microsoft Research, Redmond, WA, (2003), 7 pages.

G.A. Thomas, "Motion Estimation for MPEG-2 Coding using 'True' Vectors", BBC Research and Development Report, BBC RD, Nov. 1996, 19 pages.

\* cited by examiner

*Primary Examiner* — Kee M Tung
*Assistant Examiner* — Jwalant Amin
(74) *Attorney, Agent, or Firm* — Oblon, Spivak, McClelland, Maier & Neustadt, L.L.P.

(57) ABSTRACT

An embodiment of the invention relates to a method for generating a radiance map in High Dynamic Range (HDR) image creation by calculating mean difference curves for a sequence of images taken with different exposures and a transformation curve from the mean difference curve by an algorithm approximated to the Debevec function, by the means of which a radiance map can be calculated from the taken images. A further embodiment of the invention relates to a unit for performing this method.

11 Claims, 10 Drawing Sheets

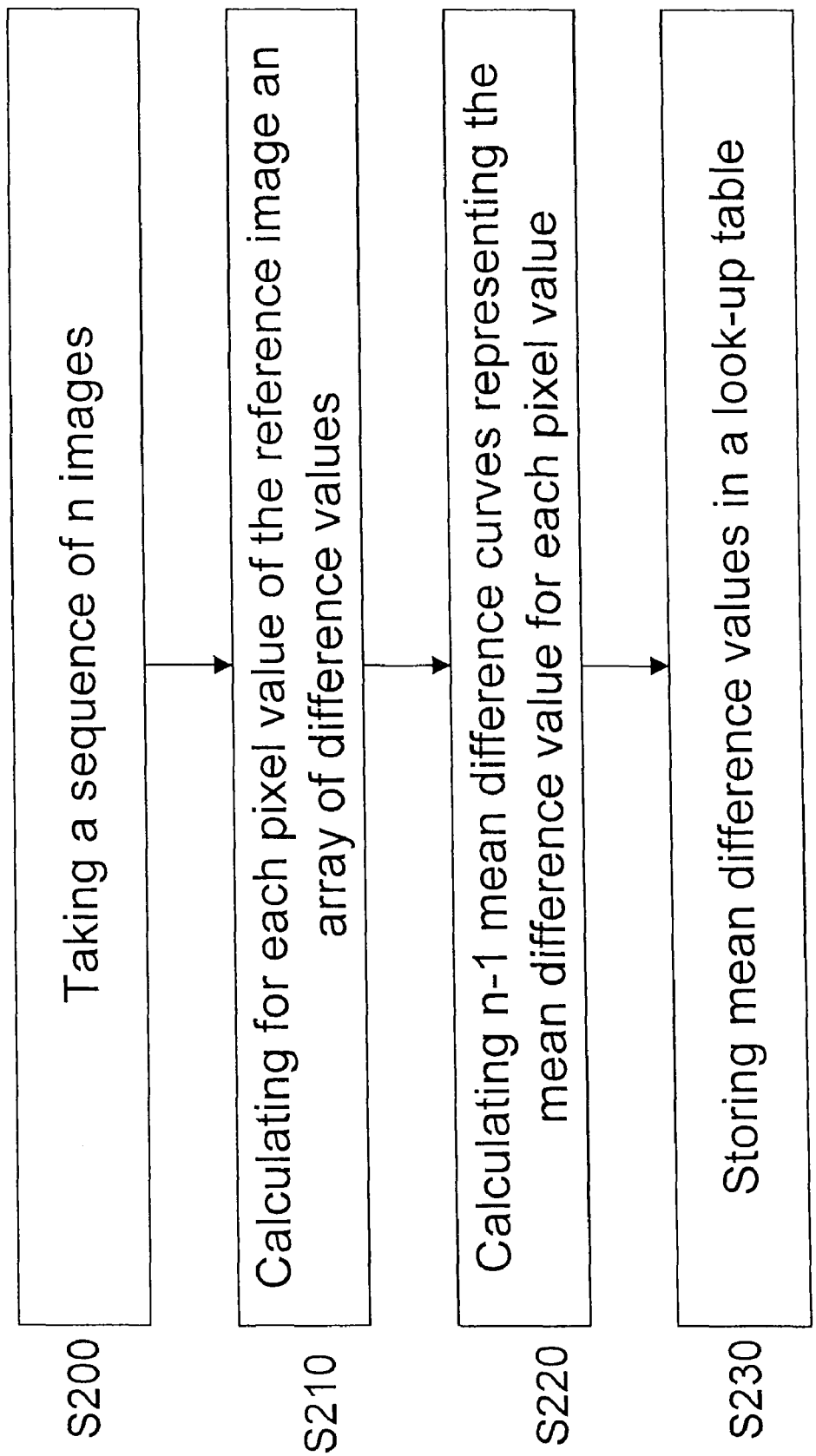

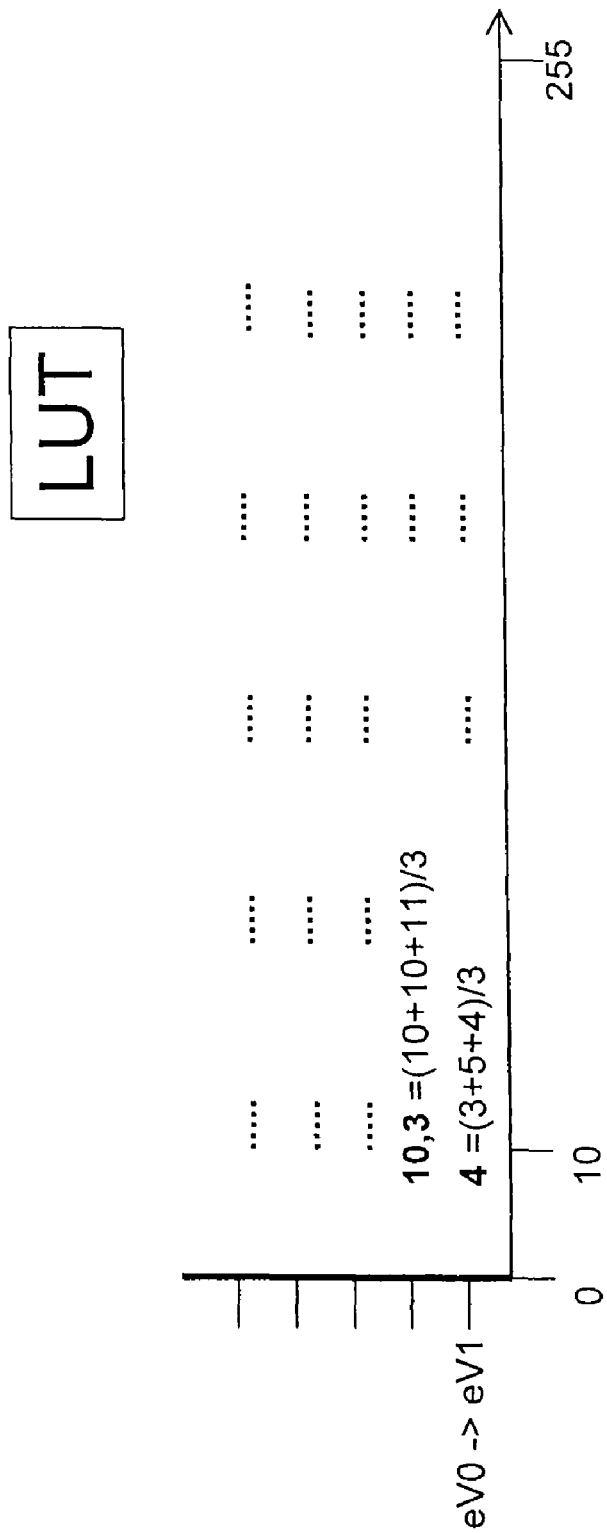

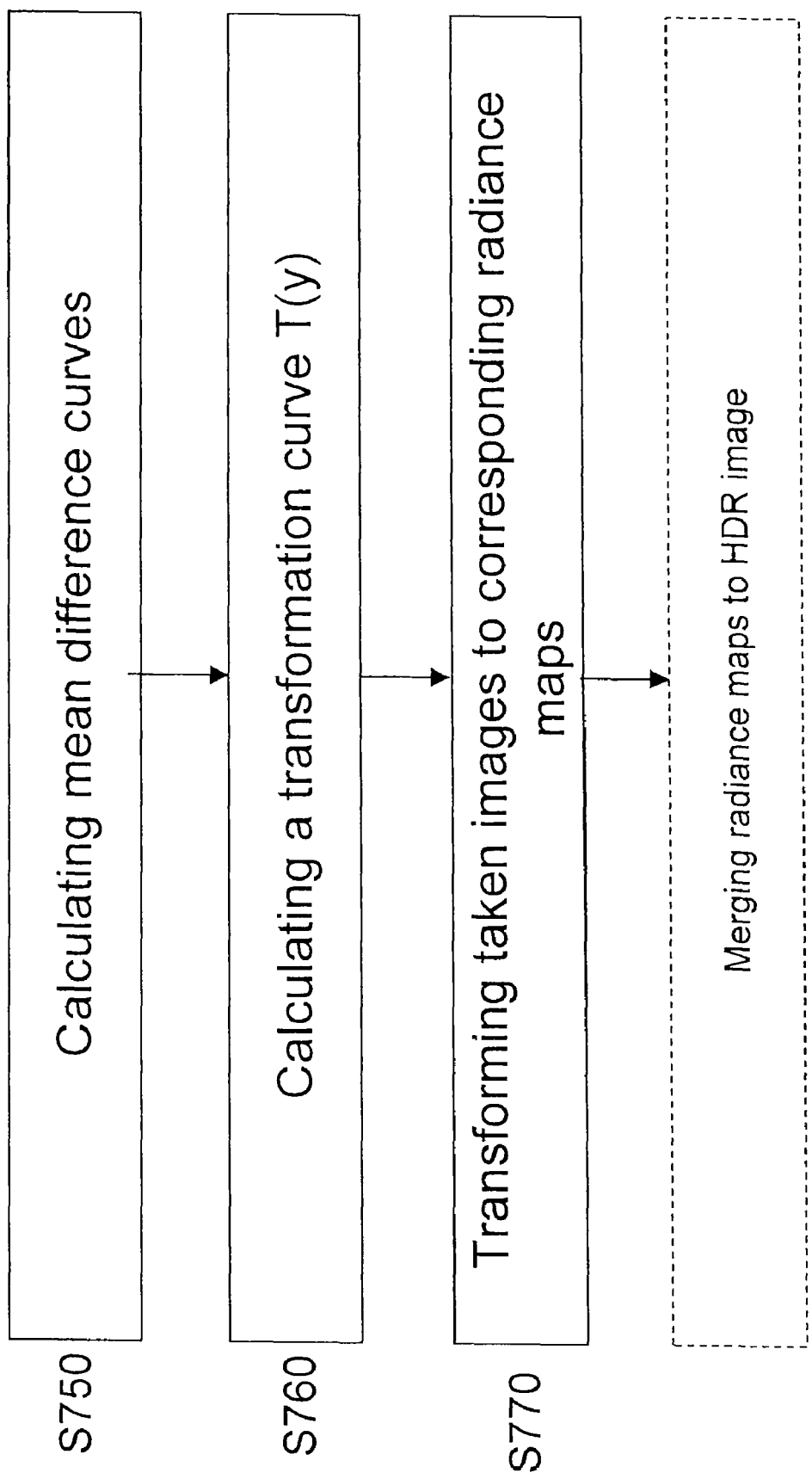

METHOD AND UNIT FOR GENERATING A RADIANCE MAP

An embodiment of the invention relates to a method for generating a radiance map in High Dynamic Range (HDR) image creation. A further embodiment of the invention relates to a unit for performing this method.

BACKGROUND

In HDR image creation, multiple images are taken at different exposures and then blended in order to obtain an image with a dynamic range higher than the dynamic range of a single image. Within this procedure of blending or merging those images with smaller exposures, which contain more information in bright areas, improve the dynamic range within these bright areas of the image, and other images with higher exposure improve the dynamic range within dark areas. Therefore by blending these images of different exposure the dynamic range of the resulting image can be increased.

For merging images in HDR imaging the radiance maps of the images have to be computed, since there is a problem in combining the images because pixel values in two different images with different exposure times do not have a linear relationship due to nonlinear mapping of the scene radiance values to the pixel values of the taken image. Therefore, in order to merge the images, the radiance values of the original scene have to be determined, which have linear relationship with other exposure radiance values. For this determination the non-linear relationship has to be obtained from the different exposure images in order to then generate a transformation curve, which can be used to obtain linearized radiance maps of corresponding different exposure images.

For solving this problem that camera post processing of images is a non-linear process, which results in a non-linear relationship between two images with different exposure times, there are methods which require a huge amount of processing, so that they are unsuitable in practice for high bit resolutions multiple exposure images (e.g. 16 bit images).

A conventional approach, which is however not appropriate for use in HDR imaging is described in Debevec/Malik "Recovering High Dynamic Range Radiance Maps from Photographs" in ACM SIGGRAPH, August 1997.

For this method in a first step multiple photographs of a scene are taken with different exposure times $\Delta t_j$. The algorithm uses these differently exposed images to recover the response function (camera response function CRF) of the imaging process of the certain camera using the assumption of reciprocity. With the so-obtained response function CRF the algorithm can fuse the multiple images into a single, HDR radiance map, the pixels of which are proportional to the true radiance values in the original scene.

This algorithm determines an inverse function of the CRF the latter mapping the actual exposure values to the pixel values. After applying this inverse function the actual radiance map is obtained. However, to determine this inverse function a quadratic objective function has to be minimized by solving overdetermined systems of linear equations. For high bit resolutions images this computational complexity is possible however too time-expensive for practical use. For example: To determine the function from five images of 16 bit resolution a system of linear equations of the order 147455 has to be solved using singular value decomposition (SVD) which is almost impractical. So for 16 bit images the Debevec-algorithm runs out of memory even on a server machine Intel® Xeon® CPU 5160, 3.00 GHz, that has 32 GB of total memory. The algorithm requires declaring a matrix of $9.02 \times 10^{10}$ Bytes, which results into running out of memory. Even if it were possible to allocate memory, the algorithm would take approximately 75 days to solve the equation.

Therefore, it is an object of the invention to provide a method for computation of the HDR radiance map within acceptable time.

The object is solved by computation of a transformation curve (inverse camera response function) which transforms the exposure images to their corresponding radiance maps. The method according to the present invention requires only few seconds to find the transformation curve which is appropriate for transforming the images with different exposures to their corresponding radiance maps.

For this computation of the radiance maps the non linear relationship between the images taken at multiple exposures has to be represented by mean difference curves which are also determined in the course of a "Method And Unit For Generation High Dynamic Range Image And Video Frame" which is the subject of a European Patent Application filed by the same applicant on Mar. 31, 2009. Such mean difference curves relate image radiance at the image plane to the measured intensity values.

BRIEF SUMMARY

The problem is solved by a method according to claim 1, a unit according to claim 6 and a computer readable medium according to claim 9. Further embodiments are defined in the dependent claims. Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 is a block diagram illustrating a method for generating a mean difference curve.

FIG. 6 shows the mean difference values of all transitions for each pixel value and is the final look-up table, which can be stored.

FIG. 7 is a block diagram illustrating a method for generating a radiance map.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is also to be understood that the features of the various embodiments described herein may be combined with each other, unless specifically noted otherwise.

Figure 1:
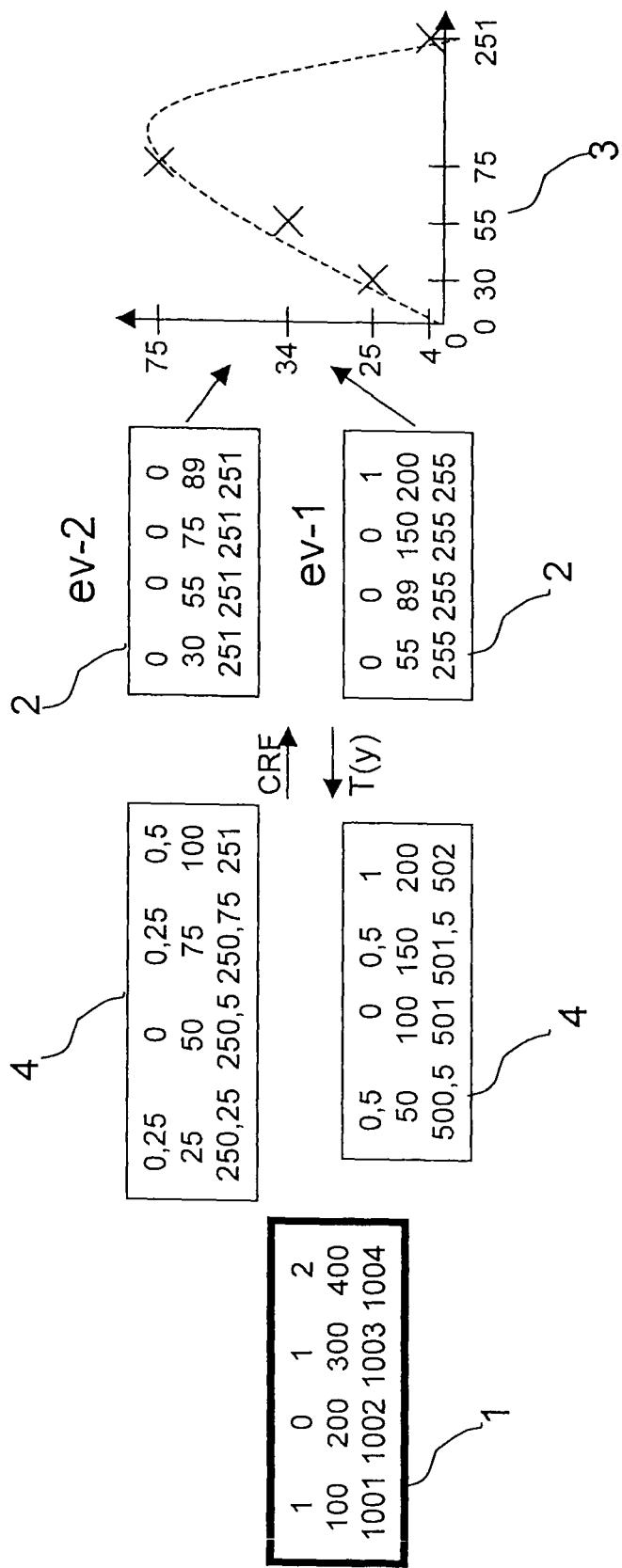
FIG. 1 is a block diagram illustrating the relation between the radiance values of the scene, the exposure images and the corresponding radiance maps, which can be recalculated from the mean difference curves.

FIG. 1 is a block diagram illustrating the relation between the radiance values of the scene 1, the exposure images 2 and the corresponding radiance maps 4, which can be recalculated from the mean difference curves 3.

Since there is a need to find the nonlinear relationship between the actual exposure values and processed pixel values in a taken image, radiance maps have to be generated from each image. Then the resulting radiance maps can be merged together to a HDR radiance map.

The radiance values of the original scene 1 are shown in FIG. 1. If from this scene 1 different images are taken with different exposure values the ideal case were exposure images with a linear relationship, as it is illustrated in the radiance maps, which however are not yet known, because after taking the images only the exposure images 2 taken with different exposure values eVx are known. These pixel values of the exposure images 2 do not have a linear relationship between the pixel values and the exposure values due to the camera response function CRF. For example, values of the real scene 1, which are "1" and "0", are both transferred to a pixel value "0" in the exposure image 2 with exposure value eV-1, while the value "2" is transferred to "1". Even more levelling are the transferred values of the exposure image 2 with exposure value eV-2, where also the value "2" is transferred to "0".

However, by means of the mean difference curve 3 to be obtained as explained in detail below and according to the subject matter of the European Patent Application dated Mar. 31, 2009 referred to above, the CRF can be recalculated to a transformation curve as an inverse function of the CRF, by the help of which for each taken exposure image 2 the corresponding radiance map 4 can be derived. This relation between CRF and transformation curve T(y) is illustrated by the arrow CRF between radiance maps 4 and exposure images 2 and the arrow T(y) in opposite direction.

Therefore, first a mean difference curve has to be calculated for a camera, which is explained in further detail in FIGS. 2 to 6:

FIG. 2 is a block diagram illustrating a method for generating a mean difference curve. In step S200 a sequence of n images is taken with a camera without local or global motion in order to generate an ideal "reference case" and can be realized with the camera mounted on a tripod. One of these images is chosen as a reference image and the others serve as auxiliary or further images, wherein an exposure value for the reference image is named eV0 and for the further images eV1, eV-1, eV2, etc. Then it is noted, how a certain pixel value, which might appear several times within the reference image, changes between reference image and a further image by a difference value, which is not necessarily constant for all pixels of the reference image. In step S210 for each pixel value of the reference image a plurality of difference values for a further image is determined and grouped as an array. In step S220 for each of the n-1 references (transitions) between the reference image and the n-1 further images a difference curve is calculated. This difference curve represents a graph which indicates a mean difference value for each pixel value. This mean difference value is calculated as a mean value from the difference values of the array of the pixel value. In a step S230 the mean difference values may be stored as these mean difference curves in a look-up table, which is then used for the camera with which the values have been calculated.

Figure 3A:
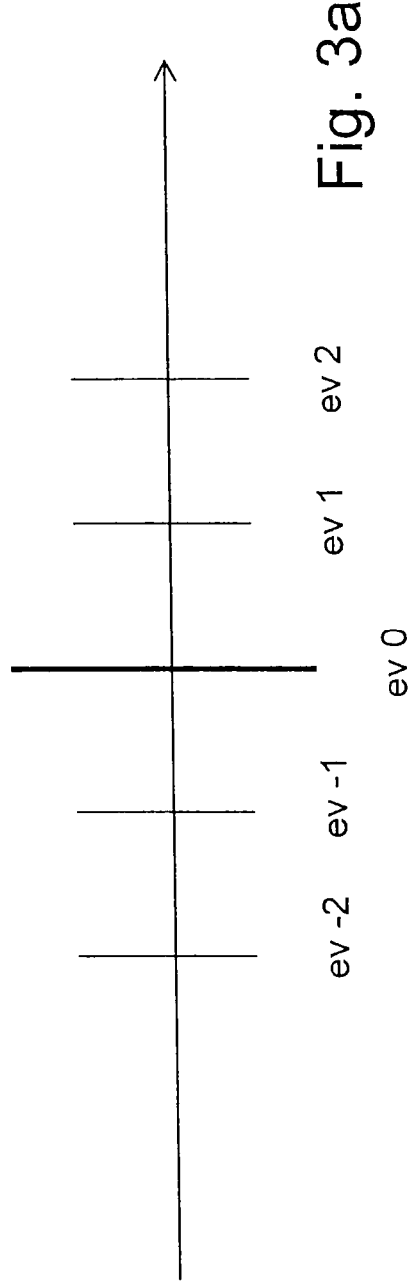
FIG. 3a is a block diagram illustrating the procedure of taking images at different exposures with non-linear changes of the pixel value.

As shown in FIG. 3a a sequence of n images is taken with different exposure values eVx, wherein the difference in exposure might derive from a difference in exposure time or a difference in aperture size. This has to happen without local or global motion in order to generate an ideal "reference case". Therefore any motion during taking the images should be avoided, e.g. by taking the images with a tripod. One of these n images is determined to be used as a reference image while the other n-1 images are used as further images for calculating differences in their pixel values relative to the pixel values of the reference image. Thereby the term pixel value comprises information on the radiance. Pixel values might be for example 0 to 255.

Figure 3B:
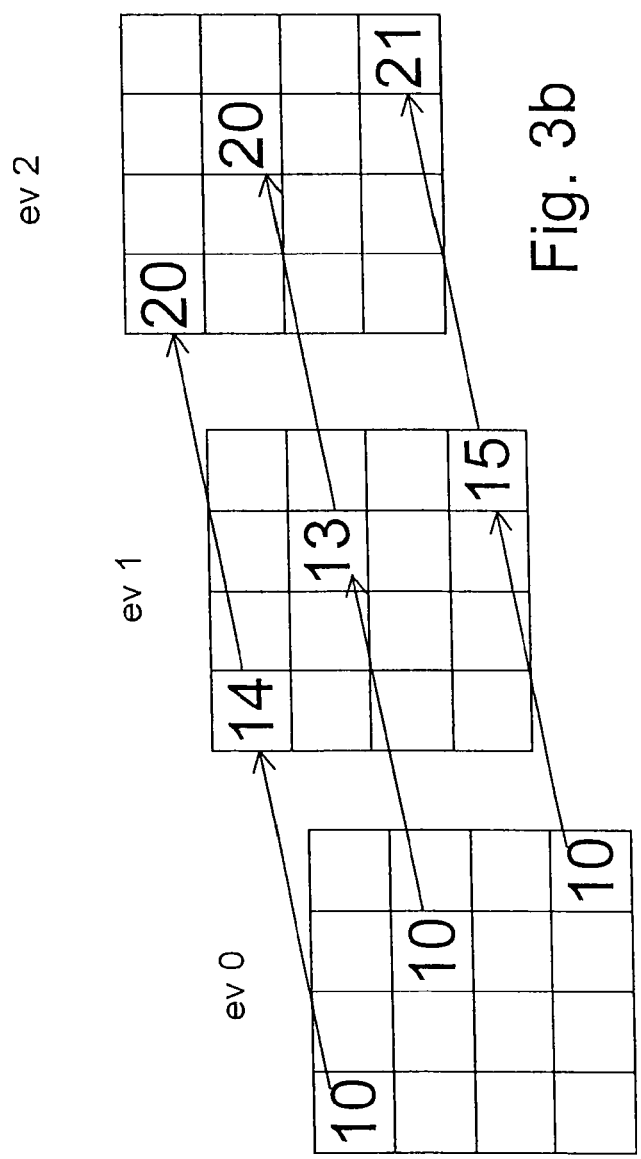
FIG. 3b shows, how a pixel value (in the example the considered pixel value is "10") is varied for different exposures. This variation/change in the pixel value can also be considered as a transition between one of the n images and one of the n−1 further images with exposure values eV1, eV2, etc.

FIG. 3b shows how a pixel value (in the example the considered pixel value is "10") is varied during transitions from the reference image to the further images with exposure values eV1, etc.

Figure 4A:
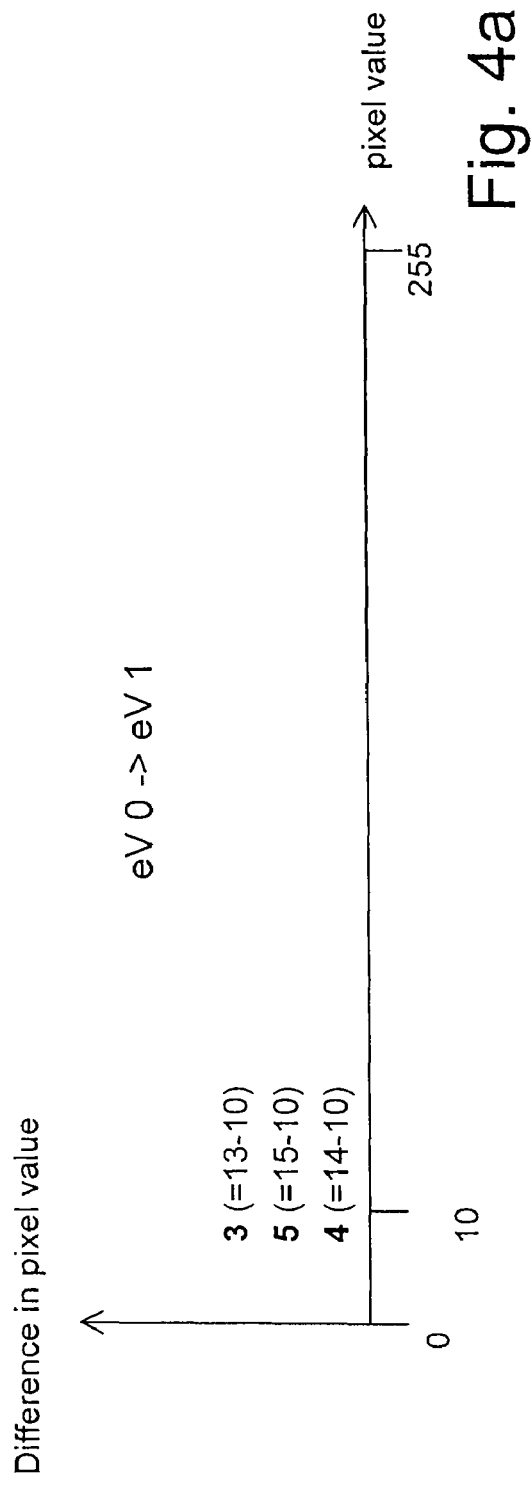
FIGS. 4a and 4b show arrays of reference values for a transition from reference image with exposure value eV0 to a further image with exposure value eV1 and for a transition to another further image with exposure value ev2.

So for each pixel value of the reference image an array of difference values is calculated for n-1 transitions (from the reference image to n-1 further images). For example in FIG. 3b the transition from eV0 to eV1 of pixel value 10 results in pixel values 14, 13 and 15. The resulting array of difference values for pixel value 10 is shown in FIG. 4a for transition to eV1 and in FIG. 4b for transition to eV2. This calculation is possible in a direct comparison of the pixels, since there is no movement within the sequence of images. The calculation is done for all n-1 transitions from reference image to the n-1 further images. Afterwards each array is "shrinked" to one value being the mean difference value of the corresponding pixel value.

Figure 4B:
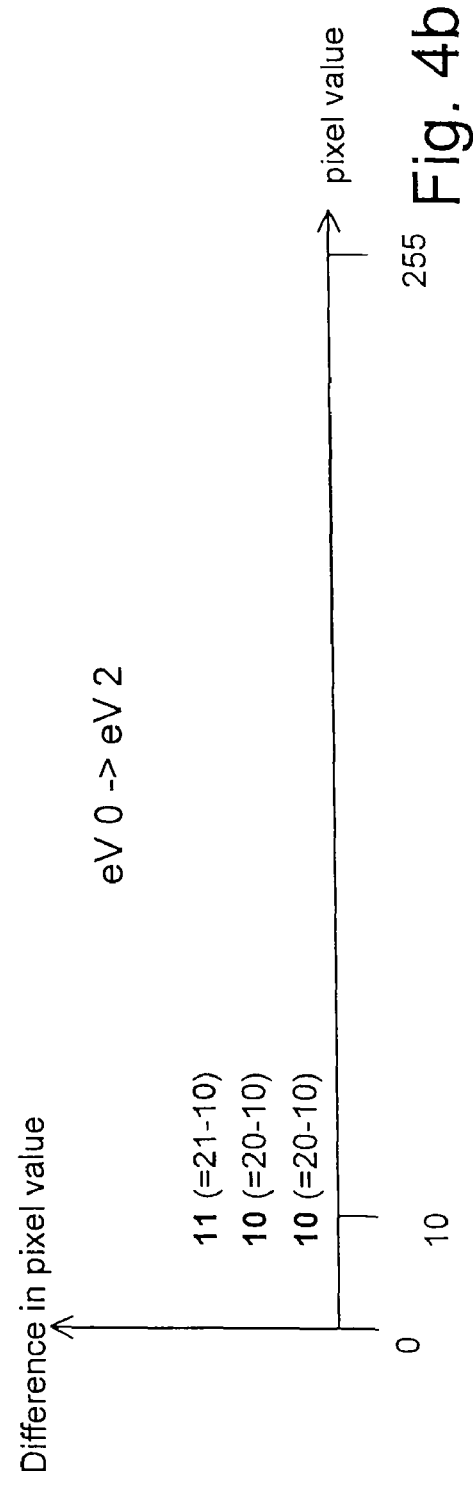
Figure 5A:
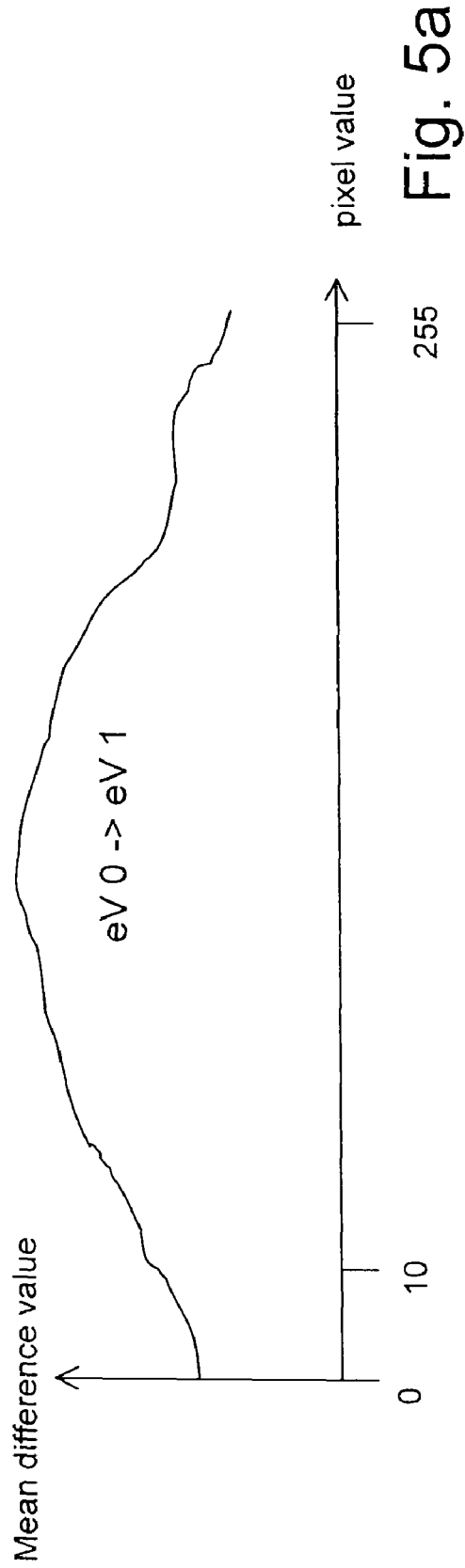
FIGS. 5a and 5b correspond to the transitions shown in FIGS. 4a and 4b and show the "mean difference value" for each pixel value of the transition of FIG. 4a or 4b.
Figure 5B:
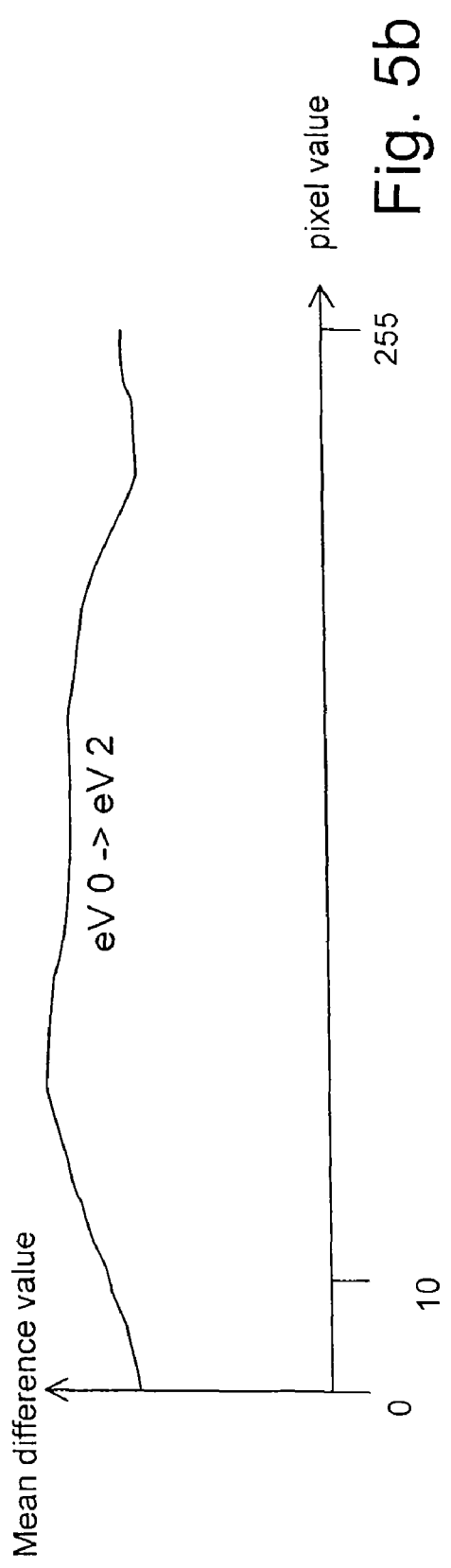

While FIGS. 4a and 4b show arrays only for pixel value 10, the corresponding FIGS. 5a and 5b take for the array at pixel value 10 and for each further array of other pixel values one mean value, so that a curve is generated, which indicates one mean difference value for each pixel value. This curve shown in FIGS. 5a and 5b for transitions from the reference image to the further image with exposure value eV1 and to the further image with exposure value eV2 is also called mean difference curve.

FIG. 6 shows a look-up table LUT with all mean difference values for the n−1 transitions (on the y-axis) for pixel values 0 to 255 to be filled in. For reasons of easier illustrations there are only two mean difference values for two different transitions illustrated for pixel value 10. If such look-up table were filled in continuously it could also be shown as a three-dimensional graph spanned above the plane of the different transitions (y-axis of FIG. 6) over the pixel values (x-axis of FIG. 6). This look-up table is then stored and it is possible to store a plurality of look-up tables for a plurality of different focal lengths and/or different ISO sensitivities.

A higher number n of different exposure images tends to provide a better weighting.

When HDR images are taken with a handheld camera and there is motion within the image sequence, alignment of the images is necessary before merging them to create an HDR image. If the images, with local or global motion, were not aligned with each other, there would be artifacts in the created HDR image.

As already explained above the look-up table is generated once for an image taking unit, e.g. a photo camera. Once being generated the look-up table can be used for aligning a sequence of images taken by the same camera even including motion.

So, once knowing the radiance-exposure-dependency represented by the look-up table, the alignment of a sequence of images for creation of an HDR image can be done without artifacts, even with motion within the sequence of different exposure images, and does not necessarily use further manual tuning of any parameters.

As already indicated, different look-up tables for different focal lengths and for different ISO sensitivities can be stored for one camera.

FIG. 7 is a block diagram illustrating a method for generating a radiance map. After calculation of the mean difference curve in Step S750, which is illustrated in FIGS. 2 to 6, a transformation curve T(y) is calculated in Step S760, which is then used to transform taken images to their corresponding radiance maps in Step S770, so that the so obtained radiance maps can be merged to a HDR image.

Figure 8:
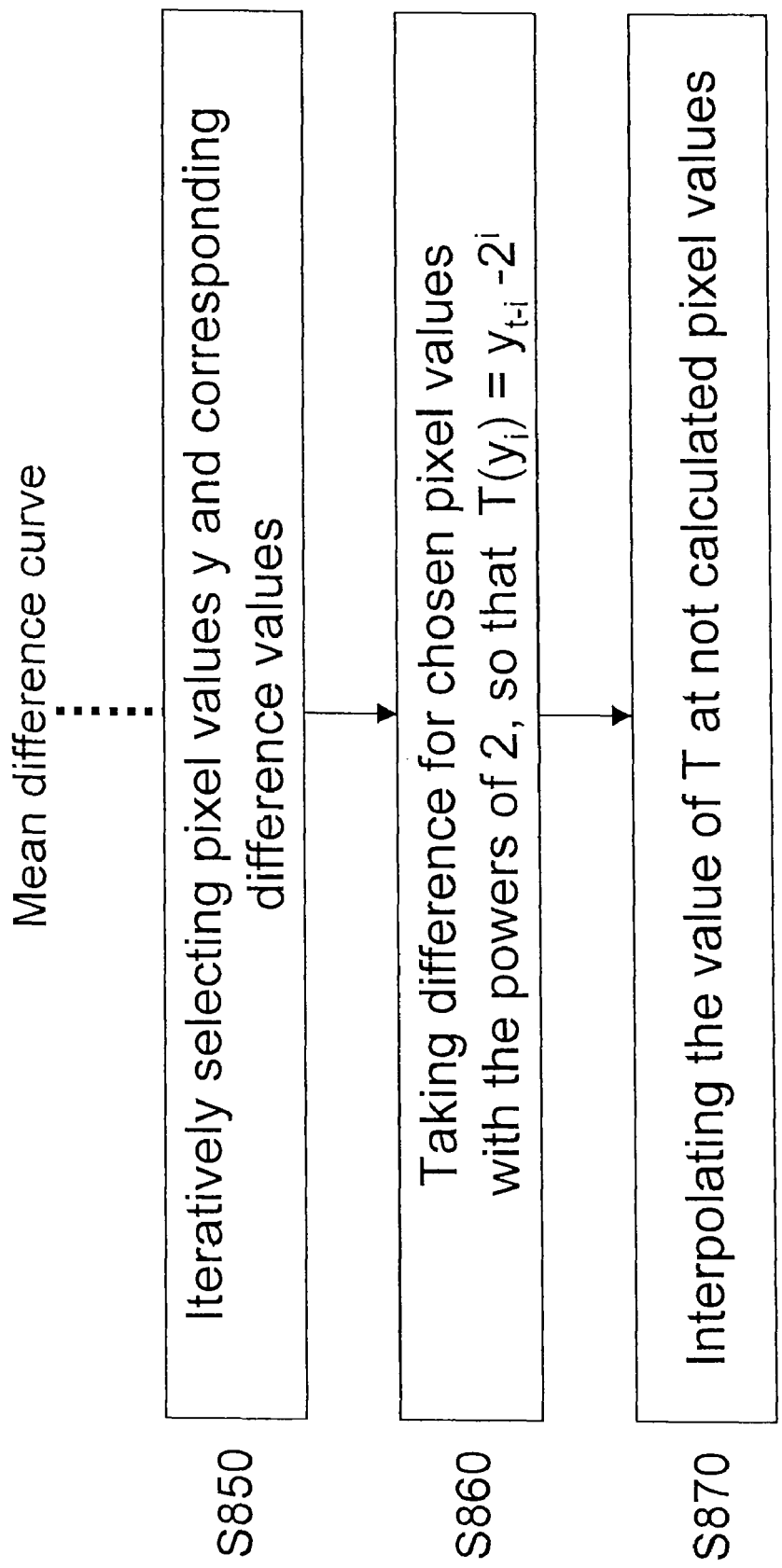
FIG. 8 is a block diagram illustrating the calculation of the transformation curve T(y).

Step S760 of calculating the transformation curve T(y) is further illustrated in the block diagram of FIG. 8.

In step S850 pixel values y are iteratively selected so that also the corresponding difference values are iteratively selected from the mean difference curve, wherein starting from the maximum possible pixel value as the first pixel value, the next pixel value is chosen by subtracting the mean difference value $f(y_i)$ for that first pixel value $y_i$ from that first pixel value according to the equation $$y_{i+1}=y_i-f(y_i),$$

where i=0, . . . , t and $y_0=2^t-1$ for t bit images, until the minimum pixel value is achieved. In an embodiment of the invention t is chosen to be 8.

Then in Step S860 a difference is taken for the chosen pixel values with the powers of 2, so that $$T(y_i)=y_{t-i}-2^i.$$

For all these chosen pixel values a difference is taken with the powers of 2 in the range of minimum and maximum pixel value. For example for maximum chosen pixel value for 8 bit i.e. 255, a difference is taken with maximum power of 2 i.e. 256. And similarly for next chosen pixel value a difference is taken with 128 and so on.

Furthermore, the value of T may be interpolated in step S870 at not calculated pixel values between 0 and the maximum possible pixel value. The resulting transformation curve gives the actual difference between the exposure image and its corresponding radiance maps.

In an embodiment of the invention the maximum possible pixel value is chosen to be 255.

Radiance maps obtained after subtracting difference curve hold linear relationship with each other.

Figure 9:
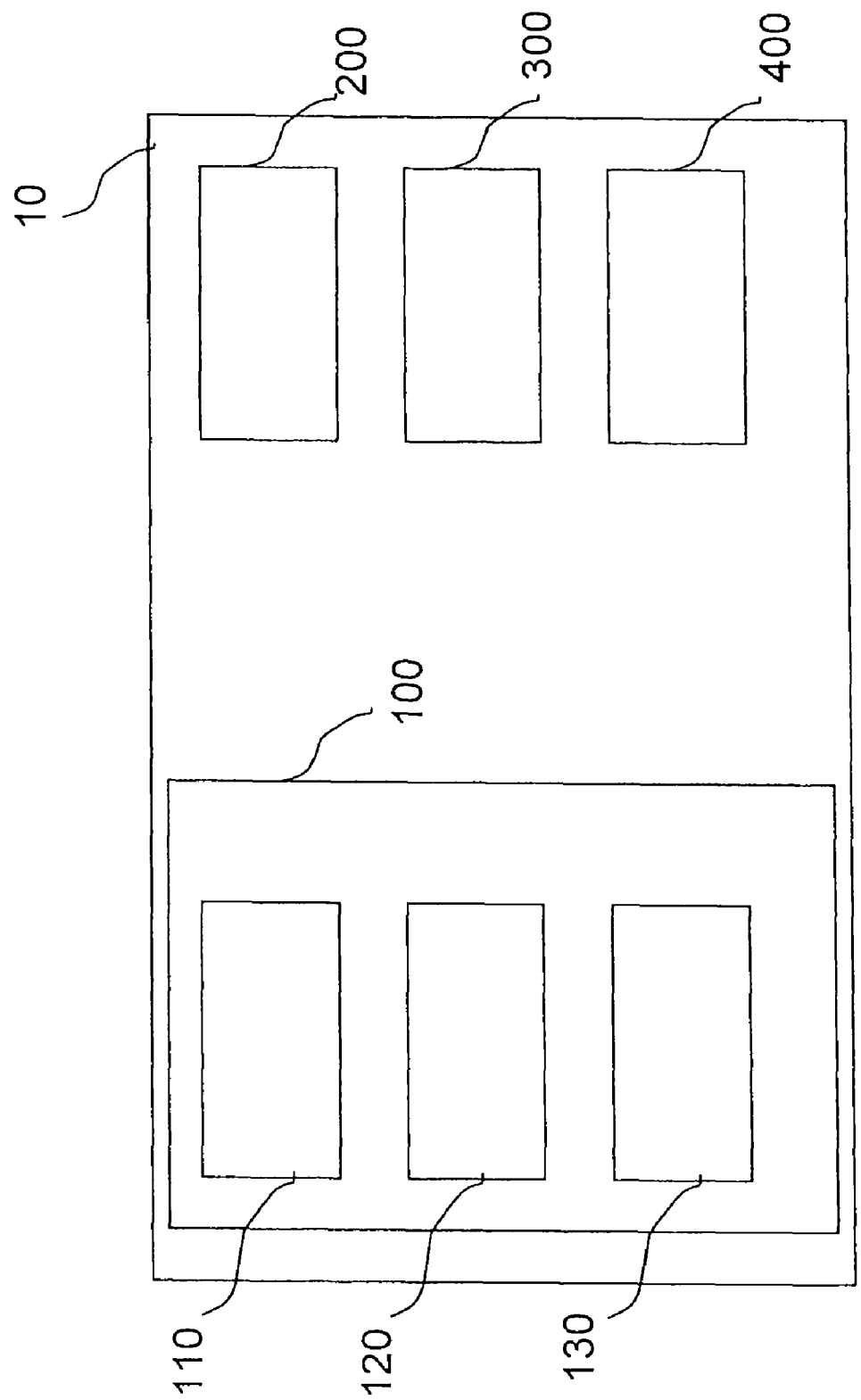
FIG. 9 shows a generation unit for generating a radiance map.

FIG. 9 shows a generation unit 10 for generating a radiance map. This generation unit 10 comprises a first calculation unit 100 configured to calculate mean difference curves f(z) for pixel values z by taking a sequence of n images with different exposures and calculating for each of n images a mean difference curve comprising mean difference values for each pixel value. It also comprises a second calculation unit 200 configured to calculate a transformation curve $T(y_i)$ from the mean difference curves and a transformation unit 300 configured to transform each of n exposure images to its corresponding radiance map by subtracting for each pixel of the exposure image the difference of the transformation curve.

The generation unit 10 may further comprise an interpolation unit 400 configured to interpolate the value of T at not calculated pixel values between 0 and the maximum possible pixel value.

The first calculation unit 100 may further comprise an imaging unit 110 which is configured to take images or a sequence of n images of an object with different exposures. Since it is necessary that the object and the imaging unit remains static with respect to each other for taking this first initializing sequence, the imaging unit or the generation unit may be arranged on a tripod not shown.

The generation unit 10 may also comprise a first processor 120 configured to calculate for each pixel value of the reference image arrays containing n−1 difference values, each array corresponding to one of the n−1 further images and a second processor 130 configured to calculate a mean difference curve for each of the n−1 further images, wherein each mean difference curve represents a mean difference value for each pixel value. The first and the second processor may also be combined as one processor. Further the generation unit 10 may comprise a storage which is not shown. This storage may be configured to store the mean difference values, which are represented for each pixel value and for each of the n−1 further images in a look-up table. The storage may also be configured to store look-up tables for different focal lengths and/or different ISO sensitivities.

Figure 10:
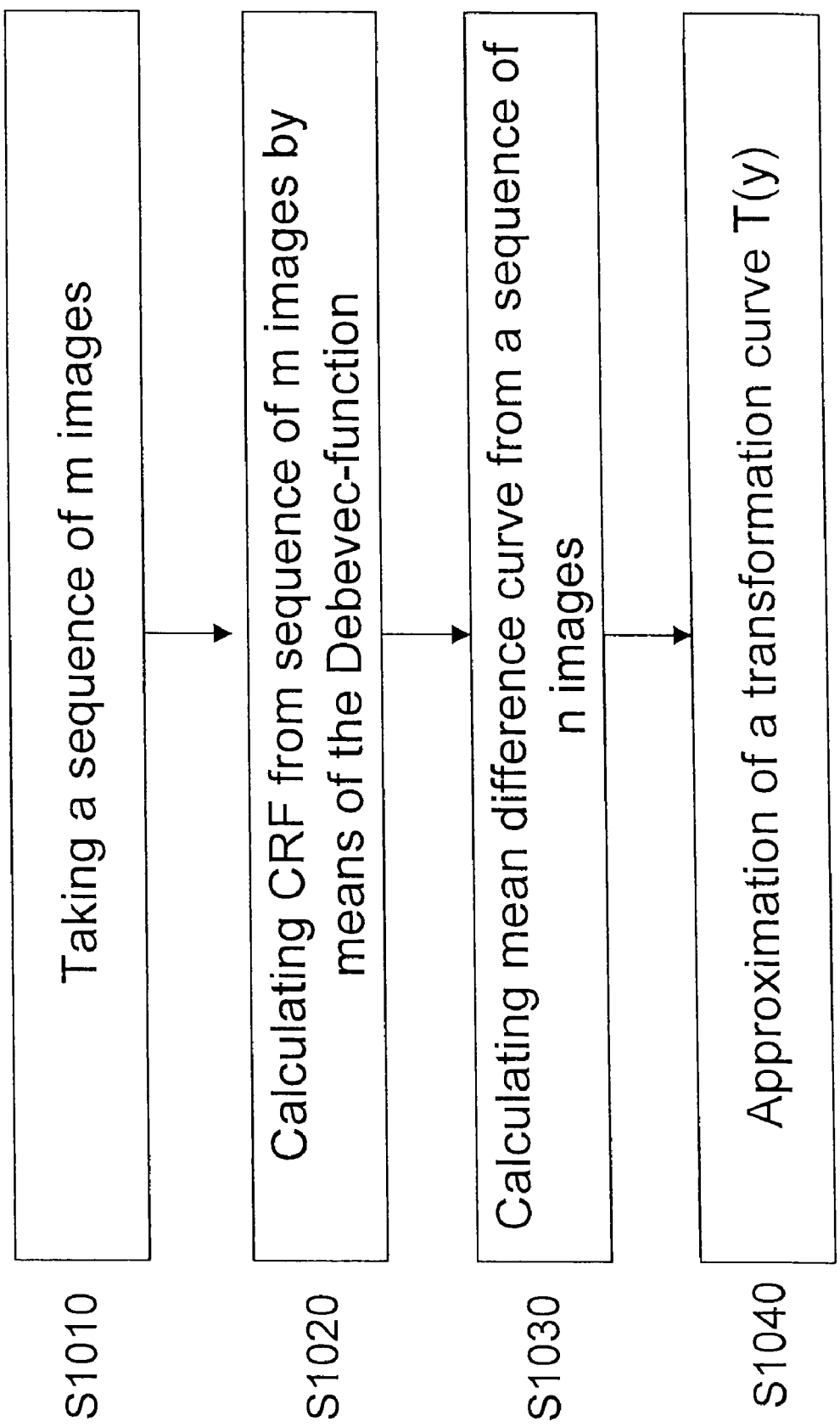
FIG. 10 is a block diagram illustrating a method for generating a transformation curve.

FIG. 10 is a block diagram illustrating a method for generating a transformation curve.

The algorithm described above referring to FIG. 8 has been elaborated from the cited algorithm according to Debevec, which has been discussed above to be too complex and too time expensive. However, there may be further approximations to the Debevec-function which are appropriate for use in recalculating the radiance maps from the exposure images. Therefore, a further embodiment of the invention is a more general approach calculating a transformation curve:

In step S1010 a first sequence of m images with different exposures is taken with a camera. In step S1020 a camera response function CRF is calculated for this specific camera from the m images by means of the Debevec function or algorithm.

For the following detailed explanation of the Debevec algorithm denotations are used as follows:

Pixel values are $Z_{ij}$, thereby i is an index over pixels (with irradiance value $E_i$) and j is an index over exposure duration $\Delta t_j$, f being the camera response function (CRF):

Then equation 1 is calculated:

$$Z_{ij}=f(E_i\Delta t_j) \quad (1)$$

so that $f^{-1}(Z_{ij})=E_i\Delta t_j$
and $\ln f^{-1}(Z_{ij})=\ln E_i+\ln \Delta t_j$
with an abbreviation of $g=\ln f^{-1}$
this leads to equation 2

$$g(Z_{ij})=\ln E_i+\ln \Delta t_j \quad (2)$$

With $Z_{min}$ and $Z_{max}$ being the smallest and greatest integer pixel value, N being the number of pixel positions and P being the number of images the minimum for equation 3 has to be found:

$$O = \sum_{i=1}^{N}\sum_{j=1}^{P}[g(Z_{ij})-\ln E_i-\ln\Delta t_j]^2 + \lambda \sum_{z=Z_{min}+1}^{Z_{max}-1} g''(z)^2 \quad (3)$$

The first term ensures that the solution satisfies the set of equations arising from eq. (2) in a least squares sense. The second term is a smoothness term on the sum of squared values of the second derivative of g to ensure that the function of g is smooth; in this discrete setting it is used:

$$g''(z)=g(z-1)-2g(z)+g(z+1)$$

This smoothness term is essential to the formulation in that it provides coupling between the values g(z) in the minimization. The scalar $\lambda$ weights the smoothness term relative to the data fitting term and should be chosen appropriately for the amount of noise expected in the $Z_{ij}$ measurements.

Because it is quadratic in the $E_i$'s and g(z)'s, minimizing O is a straightforward linear least squares problem. The over determined system of linear equations might be solved using the singular value decomposition (SVD) method.

The solution for the g(z) and $E_i$ values can only be up to a single scale factor $\alpha$. If each log irradiance value $\ln E_i$ were replaced by $\ln E_i+\alpha$, and the function g replaced by $g+\alpha$, the system of equations 2 and also the objective function O would remain unchanged. To establish a scale the additional constraint $g(Z_{mid})=0$, where $Z_{mid}=\frac{1}{2}(Z_{min}+Z_{max})$ is used, by adding this as an equation in the linear system. The meaning of this constraint is that a pixel with value midway between $Z_{min}$ and $Z_{max}$ will be assumed to have unit exposure.

The solution can be made to have a better fit by anticipating the basic shape of the response function. Since g(z) will typically have a steep slope near $Z_{min}$ and $Z_{max}$, it is expected that g(z) will be less smooth and will fit the data more poorly near these extremes. To recognize this, a weighting function w(z) is introduced to emphasize the smoothness and fitting terms toward the middle of the curve.

$$w(z) = \begin{cases} z-Z_{min} & \text{for } z \leq \frac{1}{2}(Z_{min}+Z_{max}) \\ Z_{max}-z & \text{for } z > \frac{1}{2}(Z_{min}+Z_{max}) \end{cases} \quad (4)$$

Equation (3) now becomes $$O = \sum_{i=1}^{N}\sum_{j=1}^{P}[w(Z_{ij})\cdot[g(Z_{ij})-\ln E_i-\ln\Delta t_j]]^2 + \lambda \sum_{z=Z_{min}+1}^{Z_{max}-1}[w(z)g''(z)]^2$$

Then in step S1030 $n-1$ mean difference curves $f_{n-1}(z)$ are calculated for pixel values z by taking a sequence of n images with different exposures. In step S1040 a transformation curve $T(y_i)$ is generated so that the result of $T(y_i)$ applied to the calculated mean difference curves approximates the camera response function CRF.

It is an advantage of the invention that determining the mean difference curve is not computationally complex and with this approach a mean difference curve even for 16 bit (or more) images can be obtained easily. The underlying algorithm is robust and fully automatic, so that no manual tuning of parameters is required.

Estimation of the camera response function has number of applications in the areas of image processing, image compositing, image-based modelling and rendering. More specific applications such as color constancy, photometric stereo, and shape from shading require image radiance rather than image intensity.

Furthermore, due to linear relationship between the images many other image processing methods can take benefit from the obtained image radiance maps, e.g. appearance matching, background modelling, tracking in multiple cameras and edge detection.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for generating a radiance map, comprising:
  calculating mean difference curves f(z) for pixel values z by taking with a camera a sequence of n images with different exposures and calculating for each of n images a mean difference curve comprising mean difference values for each pixel value, and
  calculating a transformation curve $T(y_i)$ from the mean difference curves by
    iteratively selecting pixel values y and the corresponding difference values from the mean difference curve, wherein starting from the maximum possible pixel value as the first pixel value, the next pixel value is chosen by subtracting the mean difference value $f(y_i)$ for that first pixel value $y_i$ from that first pixel value according to the equation $$y_{i+1}=y_i-f(y_i),$$

where i=0, . . . , t and $y_0=2^t-1$ for t bit images until minimum pixel value is achieved,
  taking a difference for the chosen pixel values with the powers of 2, so that $$T(y_i)=y_{t-i}-2^i, \text{ and}$$

transforming each of n exposure images to its corresponding radiance map by subtracting for each pixel of the exposure image the difference of the transformation curve.

2. The method for generating a radiance map according to claim 1, wherein t=8.

3. The method for generating of a radiance map according to claim 1, further comprising interpolating the value of T at not calculated pixel values between 0 and the maximum possible pixel value.

4. The method for generating a radiance map according to claim 1, wherein calculating a mean difference curve f(z) comprises taking with a camera a sequence of n images of an object with different exposures wherein the object and the camera remain static with respect to each other, wherein the sequence contains one reference image with pixel values 0 to a maximum pixel value and n−1 further images with n≧2, and calculating for each pixel value of the reference image an array containing x difference values, each array corresponding to one of the n−1 further images, wherein x is the number of times the considered pixel value appears in the reference image.

5. The method for generating a radiance map according to claim 4, wherein the maximum pixel value is 255.

6. A generation unit for generating a radiance map, comprising:

a first calculation unit configured to calculate mean difference curves f(z) for pixel values z by taking a sequence of n images with different exposures and calculating for each of n images a mean difference curve comprising mean difference values for each pixel value, and a second calculation unit configured to calculate a transformation curve $T(y_i)$ from the mean difference curves by iteratively selecting pixel values y and the corresponding difference values from the mean difference curve, wherein starting from the maximum possible pixel value as the first pixel value, the next pixel value is chosen by subtracting the mean difference value $f(y_i)$ for that first pixel value y, from that first pixel value according to the equation $$y_{i+1}=y_i-f(y_i),$$

where i=0, ..., t and $y_0=2^t-1$ for t bit images until minimum pixel value is achieved, taking a difference for the chosen pixel values with the powers of 2, so that $$T(y_i)=y_{t-i}-2^i, \text{ and}$$

a transformation unit configured to transform each of n exposure images to its corresponding radiance map by subtracting for each pixel of the exposure image the difference of the transformation curve.

7. The generation unit for generating of a radiance map according to claim 6, further comprising an interpolation unit configured to interpolate the value of T at not calculated pixel values between 0 and the maximum possible pixel value.

8. The generation unit for generating a radiance map according to claim 6, wherein the first calculation unit comprises an imaging unit configured to take a sequence of n images of an object with different exposures wherein the object and the imaging unit remains static with respect to each other and wherein the sequence contains one reference image with pixel values 0 to a maximum pixel value and n−1 further images with n>2, a first processor configured to calculate for each pixel value of the reference image arrays containing n−1 difference values, each array corresponding to one of the n−1 further images, and a second processor configured to calculate a mean difference curve for each of the n−1 further images, each mean difference curve representing a mean difference value for each pixel value.

9. A non-transitory computer readable medium including computer program instructions that cause a computer to execute a method according to claim 1.

10. A computer readable storage medium, comprising a non-transitory computer readable medium according to claim 9.

11. A method for generation a transformation curve $T(y_i)$, comprising:

taking with a camera a first sequence of m images with different exposures, calculating a camera response function CRF from the m images by means of the Debevec function, and calculating n−1 mean difference curves $f_{n-1}(z)$ for pixel values z by taking a sequence of n images with different exposures and generating a transformation curve $T(y_i)$, wherein the result of $T(y_i)$ applied to the calculated mean difference curves approximates the camera response function CRF.

* * * * *